United States Patent [19]
Nicholls et al.

[11] Patent Number: 5,553,490
[45] Date of Patent: Sep. 10, 1996

[54] VOLUMETRIC METERING EQUIPMENT

[75] Inventors: Paul Nicholls, Akeley; Aaron Walsh, West Hunsbury, both of Great Britain

[73] Assignee: Lucas Industries Public Limited Company, West Midlands, England

[21] Appl. No.: 211,735

[22] PCT Filed: Oct. 16, 1992

[86] PCT No.: PCT/GB92/01905

§ 371 Date: Jul. 5, 1994

§ 102(e) Date: Jul. 5, 1994

[87] PCT Pub. No.: WO93/08401

PCT Pub. Date: Apr. 29, 1993

[30] Foreign Application Priority Data

Oct. 16, 1991 [GB] United Kingdom .................... 9121988

[51] Int. Cl.[6] ................................................. G01M 15/00
[52] U.S. Cl. ................................... 73/119 A; 73/232
[58] Field of Search ........................ 123/494; 73/119 A, 73/232

[56] References Cited

U.S. PATENT DOCUMENTS

| | | | |
|---|---|---|---|
| 3,230,761 | 5/1961 | Sanders | 73/119 |
| 4,171,638 | 10/1979 | Coman et al. | 73/119 |
| 4,338,816 | 7/1982 | Neff | 73/119 A |
| 4,606,322 | 8/1986 | Reid et al. | 123/575 |
| 4,624,135 | 11/1986 | Bungay et al. | 73/119 A |
| 4,628,727 | 12/1986 | Seaman et al. | 73/119 A |
| 5,107,700 | 4/1992 | Kuttner et al. | 73/119 |
| 5,138,997 | 8/1992 | Fehlmann | 73/119 A |
| 5,226,311 | 7/1993 | Scourtes | 73/119 A |

*Primary Examiner*—Richard Chilcot
*Assistant Examiner*—Jewel V. Artis
*Attorney, Agent, or Firm*—Dickinson, Wright, Moon, Van Dusen & Freeman

[57] ABSTRACT

Volumetric metering equipment, especially but not exclusively for use in metering the volume of fluid pumped through one or more injectors by a diesel-engine fuel injection pump, having means which serve to cause the inertia of a moveable member, and/or a return force applied to a moveable member to reduce the time taken for a desired back pressure to be built up following a draining operation.

11 Claims, 8 Drawing Sheets

VOLUMETRIC METERING EQUIPMENT

BACKGROUND OF THE INVENTION

1. Field of the Invention

The present invention relates to volumetric metering equipment, especially but not exclusively for use in metering the volume of fluid pumped through one or more injectors by a diesel-engine fuel injection pump.

2. Description of the Prior Art

In one previously proposed form of such equipment, fuel or test oil is directed from such a pump to a piston cylinder arrangement in such a manner that the displacement of the piston provides an indication of the amount of fluid delivered by the pump. When the piston reaches its extreme end of delivery, with maximum displacement, a drain valve is switched to enable fluid to be released from the piston and cylinder arrangement, and so enable the piston to return to its starting end of delivery, corresponding to zero displacement. However, before subsequent displacement of the piston, following closure of the drain valve, can be considered to reflect accurately the amount of fluid delivered by the pump, dynamic equilibrium must be attained. One of the parameters involved in such dynamic equilibrium is the pressure of the fluid delivered to the piston and cylinder arrangement. It is desirable that this should be sufficient to inhibit the formation of any voids in the fuel or test oil. Therefore, after a return of the piston to its starting end of delivery, a certain number of injections from the pump are disregarded in order to enable the system to build up the desired back pressure. This results in an undesirable loss of time in the course of a metering operation.

SUMMARY OF THE INVENTION

A first aspect of the present invention seeks to provide a remedy to this problem.

Accordingly, this aspect of the invention is directed to volumetric metering equipment comprising (a) a metering unit having a chamber-defining part and a movable part, within the chamber-defining part, which is moveable in a given direction to increase the size of the chamber defined by the chamber-defining part and in the opposite direction to decrease the size of the chamber, (b) input and output port means of the chamber-defining part, the port means being in communication with the chamber, (c) at least one input line connected to the port means, (d) an input fluid-flow valve included in the said at least one input line, (e) an outlet line connected to the said port means and (f) a drain fluid-flow valve included in the output line, the equipment being such as to require a predetermined minimum operating pressure of fluid within the chamber, in which end-approach signal means are connected to the metering unit and are so constructed as to provide an end-approach signal when the moveable part is a predetermined distance away from the physical end of the available travel in the said opposite direction, and in which drain valve control means are directly or indirectly connected to the end-approach signal means and the drain valve and are so constructed as to close the drain valve upon receipt of an end-approach signal from the end-approach signal means, whereby (i) the inertia of the moveable part creates an increase in pressure of fluid in the chamber, to a required minimum operating pressure, by the time the speed of movement of the moveable part in the said opposite direction falls to zero, and/or (ii) the return force applied to the moveable member to move it in the said opposite direction remains transmitted to fluid in the chamber when the speed of movement of the moveable part in that direction falls to zero.

The end-approach signal means may also be so constructed as to provide a preliminary end-approach signal before the end-approach signal referred to in the immediately preceeding paragraph, in which case input fluid-flow valve control means would be directly or indirectly connected to the end-approach signal means and the input fluid-flow valve and would be so constructed as to open the input fluid-flow valve upon receipt of a preliminary end-approach signal from the end-approach signal means, whereby the pressure of fluid in the chamber is increased by the opening of the input line to the chamber prior to any effect of the end-approach signal referred to in the immediately preceding paragraph.

Preferably the end-approach signal means comprise a linear encoder arranged to provide an indication of the position of the moveable part relative to the chamber-defining part.

Referring back to the previously proposed volumetric metering equipment, the number of disregarded injections is a predetermined fixed number. Also, in the event that the number of lines from the pump which are connection to feed fluid, whether it is fuel or test oil, to the metering unit, a further series of injections are disregarded, equal in number to the said predetermined number, to ensure that the dynamic equilibrium conditions have been re-attained.

It has been found that this results in an unnecessary degree of lost time during the course of a metering operation.

The second aspect of the present invention seeks to provide a remedy to this problem.

Accordingly, in the second aspect of the present invention, volumetric metering equipment is provided in which the number of injections which are disregarded immediately following a change in which of the lines, including the drain line, are opened to the metering unit is dependent upon the average volume of fluid delivered to the metering unit per injection immediately before, at or immediately after the time of the change.

One conceivable way of doing this would be to measure the volume of injections immediately before, at, or immediately after such a change, and to compute from that volume the number of injections which are to be disregarded immediately following a change in which of the lines are open to the metering unit. The computation may involve at least one other characteristic of the delivery, such as the rate of injections.

However, a preferred construction incorporates means which cause the injections required to displace the moveable member of the metering unit by a predetermined distance to be disregarded.

Thus the second aspect of the present invention may be directed to volumetric metering equipment comprising (a) a metering unit having a chamber-defining part and a moveable part, within the chamber-defining part, which is moveable in a given direction to increase the size of the chamber defined by the chamber-defining part, (b) input and output port means of the chamber-defining part, the port means being in communication with the chamber, (c) at least one input line connected to the port means, (d) an input fluid-flow valve included in the said at least one input line, (e) monitoring means connected to the metering unit and constructed to provide electrical signals indicative of movement of the moveable part, and (f) a processor connected to the monitoring means to receive such electrical signals and constructed or programmed to provide an indication therefrom of the volume of fluid delivered to the chamber via the said input line, (g) an outlet line connected to the said port means, and (h) a drain fluid-flow valve included in the output line, in which the processor is also connected to receive electrical signals indicative of a change in the state of the said at least one input fluid-flow valve or a change in the state of the drain fluid-flow valve, and is constructed or programmed to disregard the volume of fluid delivered to the chamber which corresponds to a predetermined displacement of the moveable member immediately following such a change, so as to reduce the likelihood of errors arising through transients not having died away when the equipment is in use whilst at the same time reducing the likelihood of time being wasted by too much fluid delivered to the chamber, immediately following such a change, being disregarded.

The equipment may further comprise detector means arranged to detect pulses within such fluid, and connected to the said processor, the latter being constructed or programmed to disregard the volume of fluid delivered to the chamber at least for the period whilst a predetermined number of such pulses occur immediately following such a change. Preferably, the processor is further constructed or programmed so that, upon expiry of a longer period, corresponding to a second predetermined number of pulses occurring immediately following such a change, the processor no longer disregards the volume of fluid delivered to the chamber, in the event that such expiry occurs before the moveable part has undergone the said predetermined displacement immediately following such a change.

The second aspect of the present invention extends to volumetric metering equipment comprising (a) metering unit having a chamber-defining part and a moveable part, within the chamber-defining part, which is moveable in a given direction to increase the size of the chamber defined by the chamber-defining part, (b) input and output Fort means of the chamber-defining part, the port means being in communication with the chamber, (c) at least one input line connected to the port means and also connected to receive fluid from a fuel pump injector when the equipment is in use, (d) an input fluid-flow valve included in the said at least one input line, (e) monitoring means connected to the metering unit and constructed to provide electrical signals indicative of movement of the moveable part, and (f) a processor connected to the monitoring means to receive such electrical signals and constructed or programmed to provide an indication therefrom of the volume of fluid delivered to the chamber via the said input line, (g) an outlet line connected to the said port means, and (h) a drain fluid-flow valve included in the output line, in which the processor is also connected to receive electrical signals indicative of a change in the state of the said at least one input fluid-flow valve or a change in the state of the drain fluid-flow valve, and is constructed or programmed to disregard the volume of fluid delivered to the chamber which corresponds to a number of injections, that number being dependent upon at least one characteristic of the delivery of fluid to the metering unit, such as the volume or rate of injections immediately before, at, or immediately after such a change, so as to reduce the likelihood of errors arising through transients not having died away when the equipment is in use whilst at the same time reducing the likelihood of time being wasted by too much fluid delivered to the chamber, immediately following such a change, being disregarded.

A third aspect of the present invention is directed to volumetric metering equipment having a plurality of inputs connected to respective lines of a fuel injection pump under test when the equipment is in use, means to provide a measure of the time between two successive injections, means to compute the expected time taken for the equipment to reach a temporary static condition following the first of those injections, and means to reduce the number of lines the fluid from which is being metered at any given instant in the event that the measured time is less than the computed time.

The first, second and third aspects of the present invention extend to methods of metering fluid.

BRIEF DESCRIPTION OF THE DRAWINGS

An example of the present invention will now be described with reference to the accompanying drawings, in which.

DESCRIPTION OF THE PREFERRED EMBODIMENT

Figure 1:
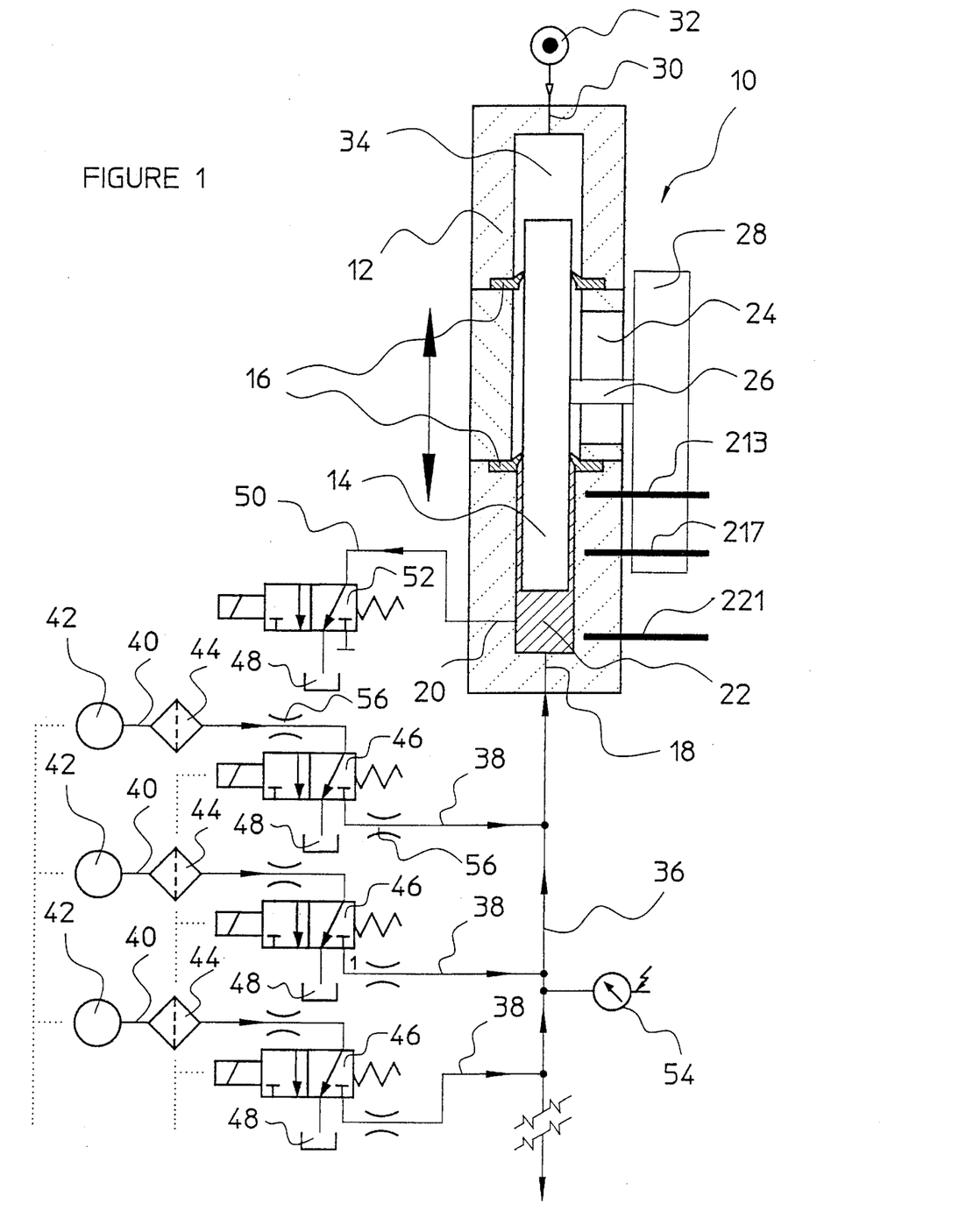
FIG. 1 shows an axial sectional view of a metering unit of the equipment coupled to an hydraulic circuit shown in the Figure in diagrammatic form.

FIG. 1 shows a metering unit 10 comprising a hollow cylinder 12 which is substantially closed at both ends and within which is contained a piston 14. The piston 14 is generally cylindrical in shape, having an external diameter somewhat smaller than the internal diameter of the cylinder 12. It is held in position within the cylinder 12 by means of bearings (not shown for clarity), and is sealed by two annular seals 16 which are spaced apart along the interior of the piston 12 so as to be in sealing engagement with the piston 14, the latter passing through the seals 16. The piston 14 is thereby slidable longitudinally of the cylinder 12. A first end of the cylinder 12 has an inlet port 18, and adjacent to that inlet port 18, and spaced apart therefrom in a longitudinal direction, is an outlet port 20. Both the inlet port 18 and the outlet port 20 open into a metering chamber 22 defined by the internal cylindrical wall of the cylinder 12, the internal wall of the end wall at the first end of the cylinder 12, one side of the seal 16 which is nearer to that first end, and a portion of the outside surface of the piston 14. This metering chamber 22 is accordingly variable in size so that a movement of the piston 14 away from the said first end of the cylinder will increase the size of the chamber 22, and a movement of the piston in the opposite direction will decrease the size of the metering chamber 22.

A longitudinally extending slot 24 is provided on one side of the cylinder 12, and a bridging portion 26 extends between the piston 14, through the slot 24, to a linear encoder 28. The latter may comprise a grating. The encoder 28 is of a known construction in which an electrical signal is issued for every increment of movement of the piston 14 of a predetermined small amount in the longitudinal direction of the cylinder 12.

The other end of the cylinder 12, being at the opposite end to the said first end, is also provided with an inlet port 30. A supply of air pressure 32 is connected to this inlet port 30 so as to create a predetermined pressure of air in the chamber 34 defined by the interior of the cylindrical surface of the cylinder 12, the interior surface of the end wall of the cylinder 12 at its said other end, one side of the seal 16 which is the nearer to the said other end, and parts of the surface of the piston 14. This air pressure therefore serves to urge the piston towards the said first end of the cylinder during use of the equipment.

A common delivery line 36 is connected to the input port 18 and also to individual delivery lines 38, one for each of a plurality of lines 40 extending from respective injectors 42 connected in turn to receive fuel or test oil from the respective lines of a fuel injection pump (not shown). Each line 40 is connected to deliver fuel or test oil to a delivery line 38 via a respective filter 44 and solenoid operated three-port, two position valve 46. In an open position of the valve, the line 40 is connected to the line 38, and in a closed position of the valve 46, the line 40 is connected to a drain 48.

The output port 20 of the metering unit 10 is connected to a drain line 50 which in turn is connected to the drain 48 via a solenoid operated shut-off valve 52 which closes the drain line 50 in a first position, in which the drain line 50 is dead-ended, and opens the line 50 to the drain 48 in a second position.

A piezoelectric point-of-injection detector 54 is connected to the common delivery line 36, so that shock waves transmitted to the common delivery line 36 upon the occurrence of an injection in a line which is open to that common delivery line will result in a corresponding electrical signal being generated by the detector 54.

Although only three lines 40 with associated injectors 42, filters 44 and valves 46 are shown in FIG. 1, eight, twelve, or indeed any number may in fact be connected to the common delivery line 36 depending upon the number of lines of the pump which is to be tested.

Each valve 46 is provided at its inlet, which is connected to the line 40, and also at its outlet, which is connected to an associated line 38, with a control orifice 56. The latter are such as to ensure that pulses or shock waves of fuel or test oil within each line 40 upon the occurrence of injections do not raise the seats of the solenoid valves.

Figure 2:
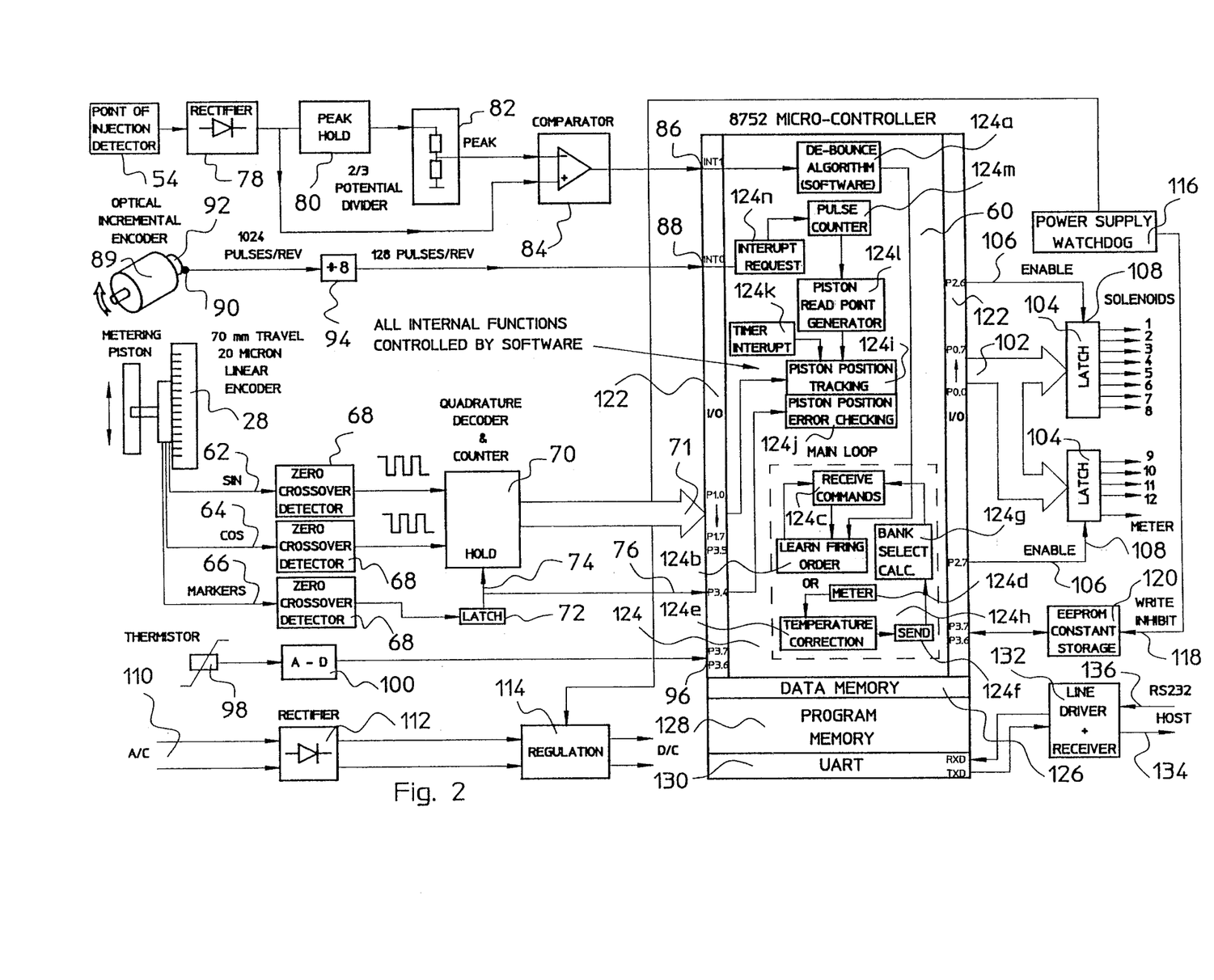
FIG. 2 shows a block circuit diagram of the equipment.

Outputs from the linear encoder 28 of the metering unit 10, and control inputs to the solenoid valves 46 and 52 are connected to an Intel 8752BH micro-controller in the manner shown in FIG. 2. Thus three outputs from the linear encoder 28, being respectively a sine output 62, a co-sine output 64, and a markers output 66, are connected to the micro-controller 60 via respective zero crossover detectors 68. Respective outputs of the zero crossover detectors 68 of the sine and co-sine outputs are connected to respective inputs of a quadrature decoder and counter 70, the output from which is connected to an input 71 to the micro-controller 60. The latter thereby receives signals indicative of the position of the piston 14 within the cylinder 12. The output from the crossover detector 68 of the markers output 66 from the linear encoder 28 is connected to the input of a latch 72, the latter having an output connected to a hold input 74 of the counter 70, and an input 76 of the controller 60.

The point of injection detector 54 is connected to the controller 60 via a rectifier 78, a peak hold 80, a potential divider 82 and a comparator 84. Each of those devices is connected in series in that order from the point of injection 54 to the controller 60, with the final output from the comparator 84 being connected to an input 86 of the controller. In addition, the output of the rectifier 78 is connected directly to a second input of the comparator 84, so that the comparator provides an electrical signal to the controller 60 indicative of the rectified output from the detector 54 at any given instant in terms of a value which is two-thirds of the current peak value of the rectifier output for the most recent series of injections.

A further input 88 to the controller 60 is connected to receive pulses indicative of the rotation of the pump shaft. This is achieved by an optical detector 90 positioned adjacent to a part which is provided with a marker 92 and which is part of or is connected to the pump shaft. The optical detector 90 generates 1024 pulses per revolution of the pump shaft. A divider 94 reduces this output to 128 pulses per revolution, and it is the output from this divider 94 that is connected to the input 88 of the controller 60.

One further input 96 of the controller 60 is connected to receive a signal from a thermistor 98, positioned to provide a measure of the temperature of the fuel or test oil in the system, via an analogue to digital converter 100.

This completes the main inputs to the controller from which measurements are made.

On the output side of the controller 60, control lines 102 are connected to latches 104 which in turn are connected to the control inputs of the solenoids of the twelve valves 46 of the different lines 40 of the equipment, and also to the control input of the solenoid valve 52 in the drain line 50. Respective further outputs 106 from the controller 60 are connected to respective enabling inputs 108 of the latches 104.

This completes the main outputs from the controller 60.

Also shown in the circuit diagram of FIG. 2 is a power supply constituted by an automatic power source connected via a rectifier 112 to a direct current regulator 114, the latter ensuring a uniform direct current output to power the system. The latter is connected to a power supply watchdog 116. The power supply watchdog and 116 is in turn connected to a write inhibit input 118 of an EEPROM constant storage memory 120 which itself is connected directly to the controller 60. All algorithm constants referred to herein are stored in this memory 120. In the event that the power supply falls to a precariously low level, the power supply watchdog 116 sends a signal to the write inhibit input 118 so that the memory 120 is protected from corruption.

The Intel 8752BH micro-controller 60 itself comprises, as is well known in the art, input/output sections 122, a programable section 124, a data memory section 126, a program memory section 128 and a UART section 130 connected to a line drive and receiver 132 having a host output 134, and an input 136 connected to an operator interface which includes a video display and printer (not shown).

The programmable section 124 of the controller 60 comprises, when programmed for use, a de-bounce algorithm 124a connected to receive signals from the input 86 and connected to send signals to a learn firing order loop 124b. The latter is looped with a receive command sub-programme 124c. Also fed to the receive command sub-programme 124c is a metering loop 124d via a temperature correction 124d, a send command 124f, and a bank select calculator 124g, in that order in series. Sub-programmes 124c to 124g constitute a main loop 124h. Inputs 71 and 76 are connected respectively to piston position tracking and piston position error checking routines 124i and 124j respectively. The former also receives signals from a timer interrupt 124k and a piston read point generator 124l. The read point generator 124l receives signals from a pulse counter 124m connected to receive signals from an interrupt request 124n, which in turn has an input connected to the controller input 88.

Figure 3:
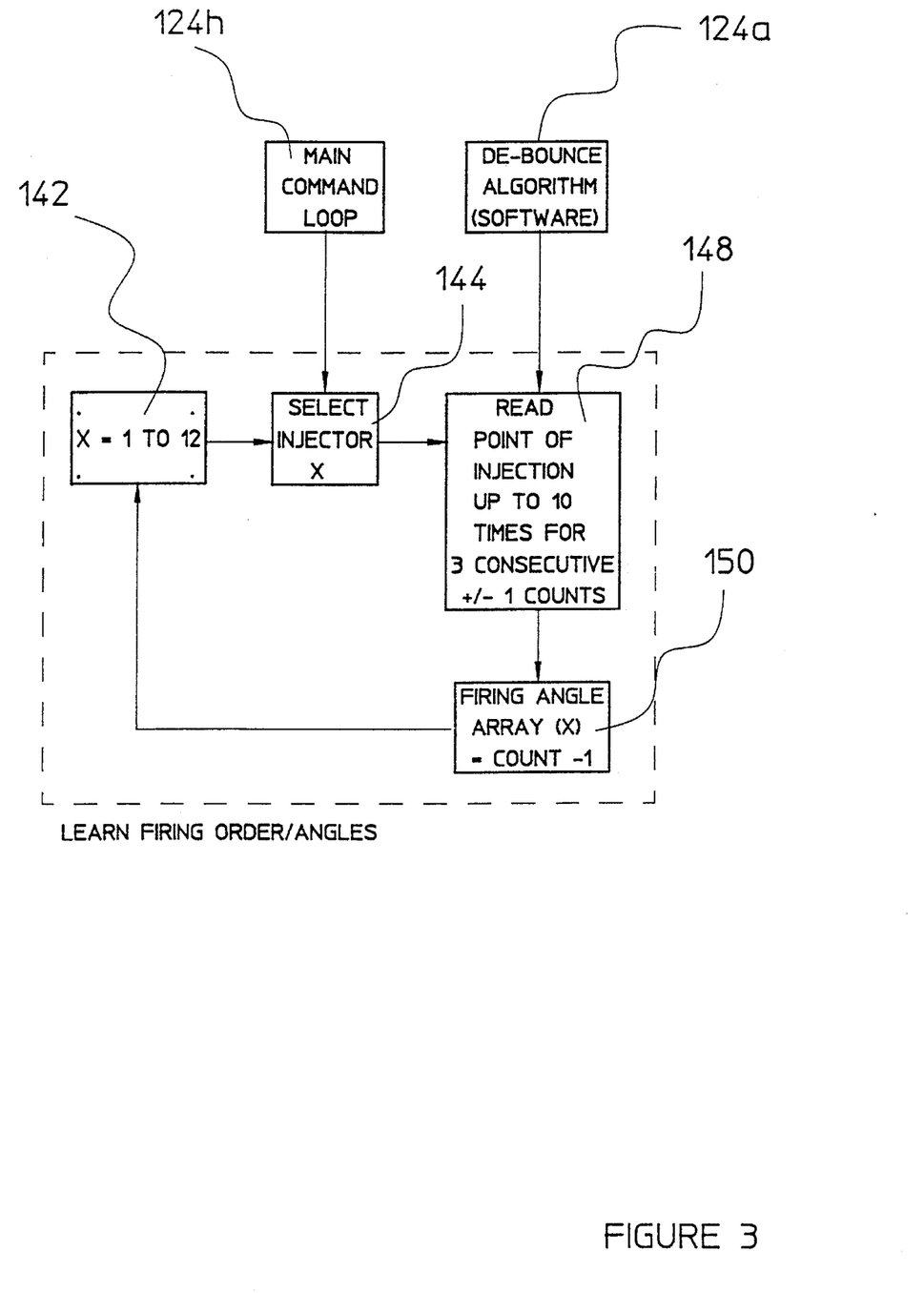
FIG. 3 shows a flow chart of an algorithm used to ascertain the order in which the different lines of a fuel injection pump have been connected to the equipment shown in FIG. 1.
Figure 4:
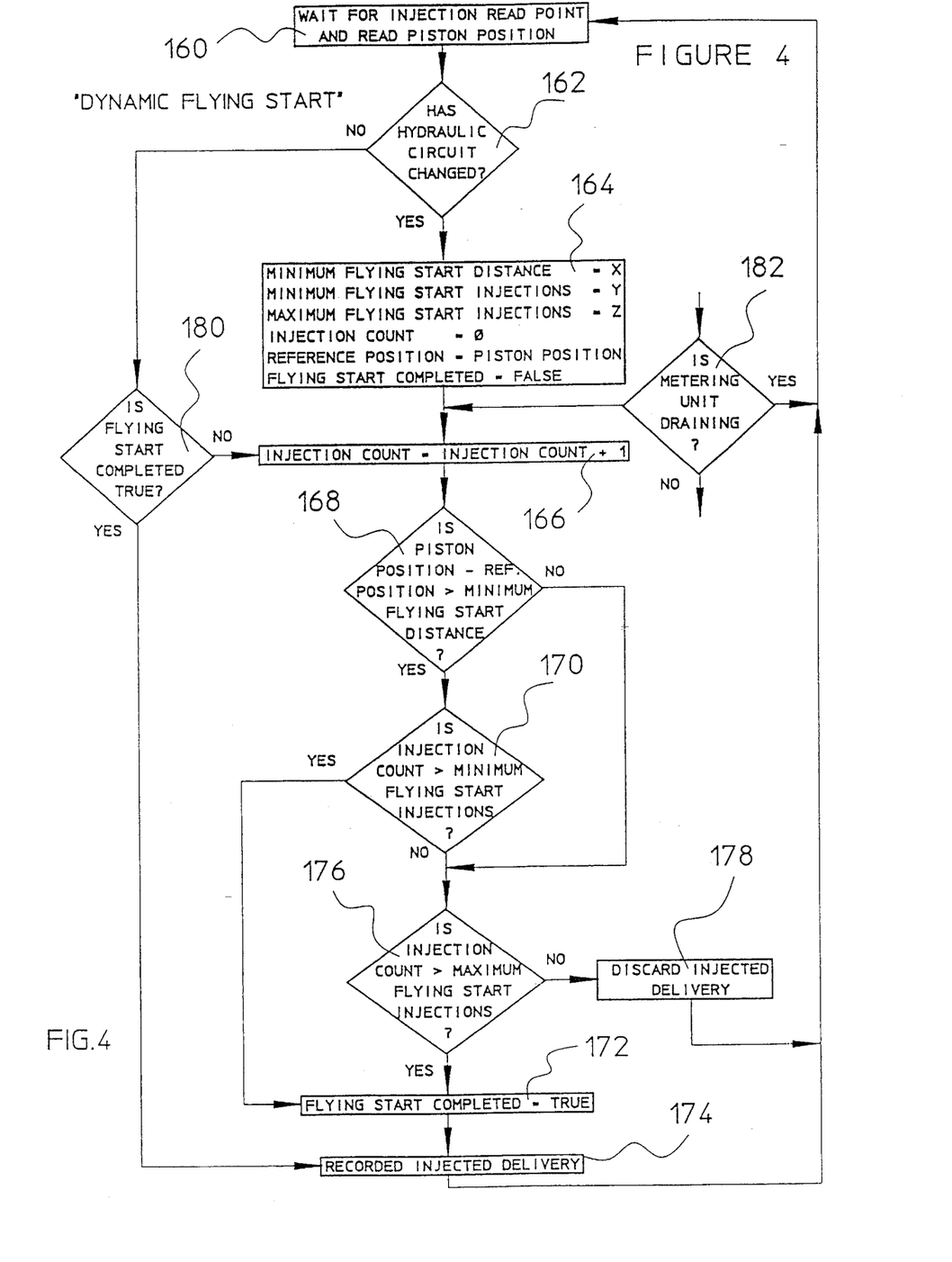
FIG. 4 shows a flow chart of a first operating sequence of the equipment shown in FIG. 1.

The operation of the equipment shown in FIGS. 1 and 2 will now be described with reference to the flowchart in FIGS. 3, 4 and 6, and the timing diagrams of FIGS. 5 and 7. From these Figures it will be readily apparent to a computer programmer how to program and set up an 8752 microcontroller to operate in the manner now to be described, from an ordinary application of well established software writing procedures.

The fuel injector pump under test may be connected to the volumetric metering equipment illustrated in FIGS. 1 and 2 with the output lines from the pump connected to the injectors 42 in any order. The shaft of the pump is connected to a drive (not shown) of the equipment via a coupling, so that the angular velocity of the pump shaft may be varied under the control of the drive of the equipment. With the pump installed in this fashion, the optical increment encoder 89 is connected to the shaft of the pump.

Initially, the solenoid valves 46 are in their de-energised state as illustrated in which the lines 40 are connected to the drain 48. A pre-run may be necessary to fill the lines 38, the common delivery line 36, the cavity 22, and the drain line 50 prior to a metering procedure, and also to build up the pressure of the fuel or test oil in the system to the required pressure, sufficient to ensure that no voids are created in the oil that could give rise to an erroneous reading.

Prior to a first metering procedure with the pump thus connected to the equipment, a further pre-run may be necessary to establish the order in which the different lines of the pump are connected to the various test injectors 42. The program stored in the program memory 128 of the controller 60 which effects this pre-run comprises the steps shown in the flow chart of FIG. 3. The program is brought into operation in accordance with a start-up procedure defined in the main command loop 124h. The program itself comprises a loop in which the first step 142 initially sets the value of the selected line, X, equal to one, corresponding to the first line of the twelve lines 40 illustrated in FIG. 1. The next step 144 of the firing order loop selects the line corresponding to the value of X and energises the solenoid of the valve 46 in that line by sending appropriate outputs to the enabling line 106 and the output 102 from the controller 60. This command therefore switches the solenoid valve 46 of the first line into its energised condition in which the line 40 is connected to the common delivery line 36 to which is connected the piezoelectric point-of-injection or commencement-of-injection detector 54. The latter creates signals at the input 86 of the controller 60 from which the software de-bounce algorithm 124a in a program stored in the controller 60 eliminates signals resulting from reflected shock waves in the fuel or test oil following an actual injection.

The third step 148 of the firing order loop records a count of pulses from the divider 94 following the instant the optical mark 92 on the optical incremental encoder 89 passes the detector 90, reached at the instant of the point-of-injection detected by the detector 54. Once three consecutive counts have been recorded at the step 148 of the loop, none of which differ by more than one from any other one of those three counts, the loop passes to its fourth step 150 in which the firing angle, being the established highest count of the three consecutive counts minus one, is stored in an array of the firing angles of the twelve lines for the first line. The loop then reverts back to the first step but with the value of X now incremented to the value 2, whereupon the steps of the loop are repeated for the second of the twelve lines. This is then continued for the third line and so on to the twelfth line, whereafter the firing angle array is completed, and the firing order established.

Once the phase angles for the different lines of the different delivery lines 40 have thus been ascertained, the equipment is ready to perform a metering operation. This may involve the switching in of all the delivery lines 40 to the common delivery line 36 by opening all the solenoid valves 46, or it may involve opening half of those lines, especially if the angular velocity of the pump shaft is very high, and/or if the fuel delivery is high. If one particular line is being monitored particularly closely, it may involve opening only that line to the common delivery line 36. Further changes may occur to the hydraulic circuit shown in FIG. 1. For example, the switching in of one or more of the lines 40 to the common delivery line 36 may occur directly after a draining of the metering chamber 22. Alternatively, the number of lines connected to the common delivery line 36 may be halved whilst the piston 14 is midway between its two ends of delivery, for example in the event that the angular velocity of the pump shaft is increased beyond a predetermined value at that stage.

The number of injections required to bring the hydraulic circuitry into a dynamic equilibrium following such a change will vary depending, for example, on the volume of fuel test oil per injection. If readings are taken before dynamic equilibrium is reached, spurious results will inevitably be obtained. Conversely, if readings are recorded after dynamic equilibrium has been reached, any delay between the time when such equilibrium is reached and the time when readings start to be recorded will be time lost, resulting in a contribution to inefficiency of the system. With a view to reducing any such inefficiency whilst retaining an acceptable degree of accuracy, the controller 60 is programmed in accordance with the flow chart shown in FIG. 4. It effects what might be termed a dynamic flying start. Thus, with reference to FIG. 2, upon reception by a pulse counter 124m within the controller 60 of a sufficient number of pulses to give a count corresponding to a phase of a given selected line, a piston read point generator 124l connected to the pulse counter 124m triggers a signal for a reading of the piston position, as indicated by the input 71 to the controller 60, to be taken. The first step 160 of the dynamic flying start procedure illustrated in FIG. 4 is to wait for this reading to occur. The next step 162 is to raise a flag (this being an electronic indicator) in the event that the hydraulic circuit has undergone one of the aforementioned changes. If it has, then certain parameters are set at step 164. In particular, the EEPROM memory 120 is accessed to read off the value X set for the minimum flying start distance required, being the minimum distance of travel of the piston 14 immediately following a change in hydraulic circuitry that is considered necessary to achieve dynamic equilibrium, the number Y of injections which is considered to be the minimum necessary to achieve dynamic equilibrium notwithstanding that the aforementioned minimum distance of travel has already occurred, and the number Z of injections which is considered to be sufficient to achieve dynamic equilibrium notwithstanding that the piston has not yet travelled the distance X immediately following a change in the hydraulic circuitry. The injection count at step 164 is set to zero, and the current piston position is memorised. Finally, a "flying start completed" flag is set to false.

Typical values for X, Y, and Z are 0.1 mm, 10 injections and 60 injections.

These values having been set at step 164, the injection count is incremented at step 166. The next step 168 checks whether the current piston position, less its reference position set at 164, has exceeded the minimum flying start distance X. If it has, the flow path passes to step 170 at which the question is asked, whether the value of the injection count has exceeded the minimum number of flying start injections Y. If the answer to that question is also in the affirmative, the flow chart passes to step 172 which changes the "flying start completed" flag to true, so that the injected delivery to the measuring chamber 22 at the injection concerned is recorded at step 174 to form part of the metering statistics, whereafter the flow path is looped back to step 160 to the next injection.

If at step 168 the distance of travel of the piston immediately after the change in the hydraulic circuit has not exceeded the minimum flying start distance X, then the flow path by-passes step 170 and moves straight to step 176, at which the question is posed, whether the injection count has exceeded the maximum number of flying start injections Z. If it has not, then the equipment is not deemed to have reached dynamic equilibrium, and the reading for the injected volume for that injection delivered is discarded at step 178, whereafter the flow path is looped back to step 160.

If, at step 170, the injection count has exceeded the minimum number of flying start injections Y, step 176 is by-passed so that the flow path passes directly to step 172, to change the "flying start completed" flag to true and pass on to recordal of an injected delivery at step 174 and thence back to the starting step 160.

If, at step 176, the injection count has exceeded the maximum number of flying start injections Z, then the flow path count passes directly to step 172 to change the "flying start completed" flag to true and to effect recordal of the injected delivery at step 174 and pass the flow path back to the starting step 160.

If, at step 162, the hydraulic circuit has not changed, this may be because a flying start procedure is underway. Therefore, the question is asked of the flow chart at step 180, whether, if the hydraulic circuit has not changed, the "flying start completed" flag is true or not. If it is not, it is understood that the flying start procedure has not been completed, and the flow path passes to step 166 at which the injection count is incremented and the relevant questions regarding the size of the injection count and the distance of piston travel are asked. If, however, the "flying start completed" flag is true, then the flow path passes directly from step 180 to step 174 at which the injected travel is recorded and the flow path passed back to the start step 160.

A further step 182 is included in the dynamic flying start procedure to ensure that, in the event that the metering unit is draining, the dynamic flying start procedure is overridden.

Figure 5:
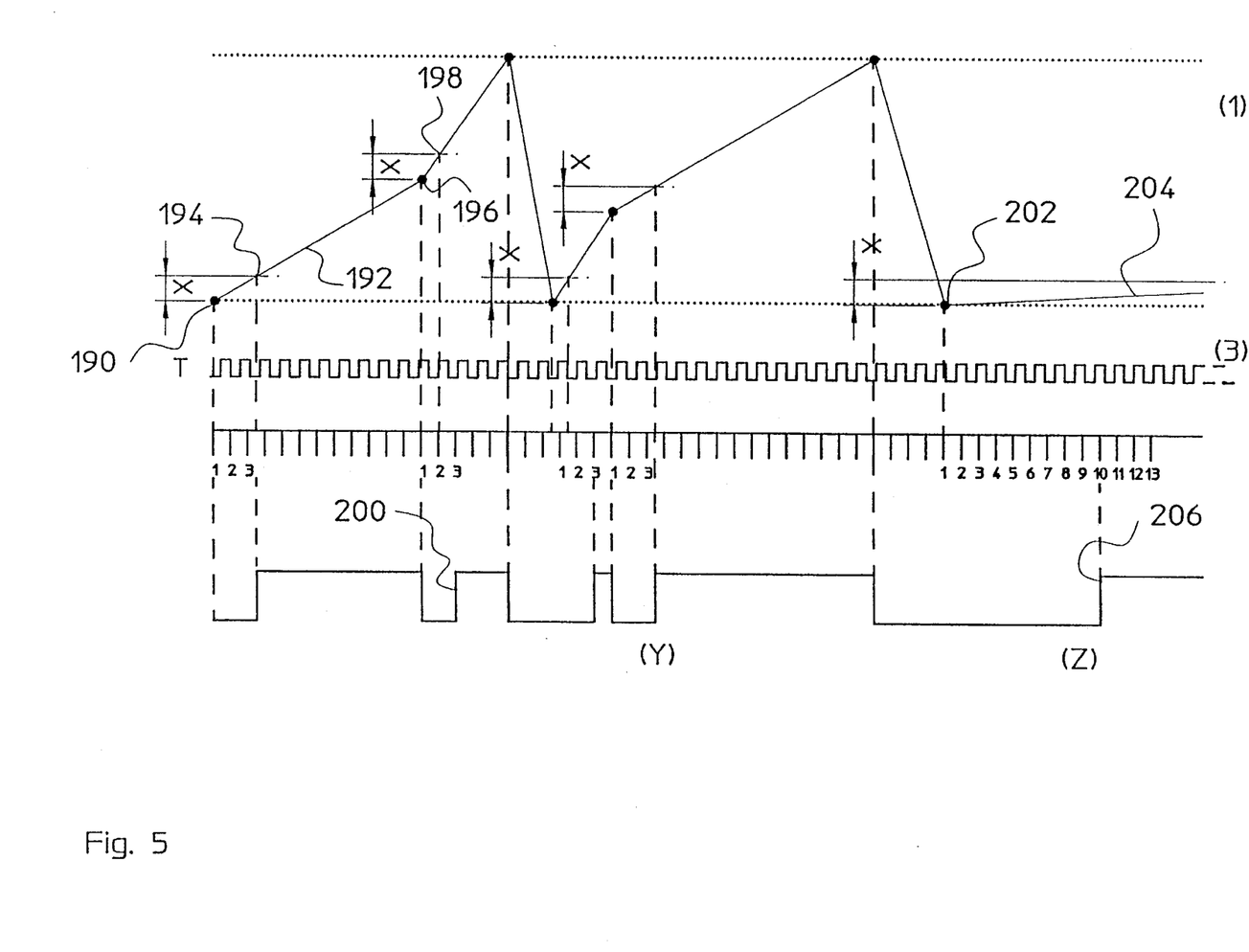
FIG. 5 shows a timing diagram of operations carried out during the use of the first operating sequence.

The consequence of such a "dynamic flying start" procedure in the course of a series of measurements, is illustrated in the timing sequence of FIG. 5. The square wave pulse signal labelled T in this diagram represents the time, each square wave cycle representing a unit of time. It should be borne in mind that FIG. 5 is purely diagrammatic, so that the relative gradients illustrated do not necessarily reflect the gradients that would be found in actual equipment embodying the present invention. Nonetheless, for the purposes of the diagram, common graphs share a common time scale.

Directly underneath the time scale T is a timing sequence representing injection read points at which a reading of the current position of the piston is taken by the controller 60. Below this is a square wave signal representing the "flying start completed" flag, in which a high level represents times when the flag has a true value, and the low level represents the times when it has a false value.

Accordingly, the high level here represents those times when a reading of the piston position at each injection read point is taken and recorded for metering purposes, whereas the low level represents times when the injected delivery for a given injection read point is discarded.

The uppermost graph in FIG. 5 represents the position of the piston as a function of time, so that greater distances of displacement of the piston within the cylinder are represented by higher points on the graph.

Thus at the beginning of the uppermost graph in FIG. 5 a black disc 190 represents the commencement of a metering procedure in which half the valves 46 are switched to connect their associated lines 40 to the common delivery line 36. The gradient of the line extending from that disc 190 represents the average speed of travel of the piston from its starting end. Whilst such movement should in fact be represented more by a stepped movement, with a small oscillatory component at the start of each step, corresponding to the successive injections, it is here for the sake of simplicity represented by a simple straight line 192. At the point 194 on the straight line 192, the piston has travelled a distance X, being the minimum flying start distance preset by the value therefor recorded in the EEPROM memory 120. If the minimum number of flying start injections Y has been set to the value three, and the maximum number of flying start injections, Z, has been set at ten, it will be seen from the timing sequence in FIG. 5, that the point 194 occurs after the minimum number of flying start injections have occurred (counting the injection point that is substantially coincident with the point 190 as the first). At the same time, the point 194 occurs before the maximum number of flying start injections have occurred since the distant 190. In this case, the point at which the "flying start completed" flag flips from false to true, and hence the point at which the volume of injected deliveries is recorded, coincides with the point in time at which the piston 14 has completed the minimum flying start distance X immediately following the point 190.

At the point represented by the black disc 196, those valves 46 which had hitherto been closed are now opened. This point therefore represents a stage at which the hydraulic circuit is changed. Consequently a further "dynamic flying start" procedure is initiated in accordance with FIG. 4. It will be seen that the piston is displaced by the minimum flying start distance X, immediately following the point 196, at the point 198, but that at this point in time, the minimum number of flying start injections Y has not occurred since the change point- 196. Therefore, in this situation, the overriding factor is the value of the minimum number of 10 flying start injections Y, which are completed immediately following the change point 196, at the point on the lowermost graph labelled 200.

In the case of the change which occurs at point 202 in the uppermost graph, following which the gradient of the line 204 representing the mean speed of movement of the piston 14 is of a relatively low value, the piston does not move through the minimum flying start distance X until well after the maximum number of flying start injections have occurred. The instant at which the latter occurs is represented by the point 206 of the lowermost graph, and it is therefore this point at which the "flying start completed" flag flips from false to true.

Whilst the "flying start completed" flag is true, the equipment operates in a conventional manner to record the volumes of fuel or test oil injected at each injection. Thus upon every pulse from the divider 94, corresponding to 1/128th of a pump shaft revolution, an interrupt request signal is generated at the interrupt request 124n shown in FIG. 2. A signal from the interrupt request 124n decrements the count in the counter 124m and if the resulting count corresponds with one of the memorised phases of the different lines, the piston read point generator 124l causes the value of the piston position in 124l to be read. Each piston position so recorded is compared to the last recorded value to ascertain the value of fluid (calculated from the diameter of the piston) injected by the current injection, and the line to which this volume is attributed is known from the memorised values of the line phases. The recorded volume is added to the appropriate value of the accumulated volume for each line. These values may be termed collectively the delivery array. This is executed in the meter loop 124d. The recorded volumes may be displayed on a video screen (not shown) and/or printed out on paper (not shown), for example as a bar chart with each bar representing the accumulated volumes of injections for a given line. This procedure will not be described in any further detail since it forms part of the existing art.

The bank select calculator 124a calculates an expected time taken for the piston 14 to come to rest following an injection, from the time between injections, the volume per injection and the pump speed. If this exceeds the time available between injections, a reduction in the number of lines 40 connected to the command delivery line 36 at any one time is made, by alternately connecting different groups (or banks) of lines to the metering unit. For example, there may be two groups, one comprising any number from one to twelve of the lines, and the other group comprising the remainder of the twelve lines. Or there may be more than two groups, for example three groups of four lines.

Means may be provided to check that any change in angular velocity of the pump shaft has not significantly changed the phases of the points-of-injection of the different lines. Thus if the phase of the first line has shifted, all the memorised values for the phases are shifted by the same amount.

The line portions having a negative gradient in the uppermost graph shown in FIG. 5 represent draining of the metering chamber 22. This occurs when the piston reaches its far end of travel, at which point in time the solenoid valve 52 is switched to its open condition to connect the drain line 50 to the drain 48. Accordingly, fuel or test oil is urged out from the metering chamber 22 by movement of the piston 14 towards its start end of travel, through the outlet 20, under the action of the force of pressurised air in the chamber 34.

Figure 6:
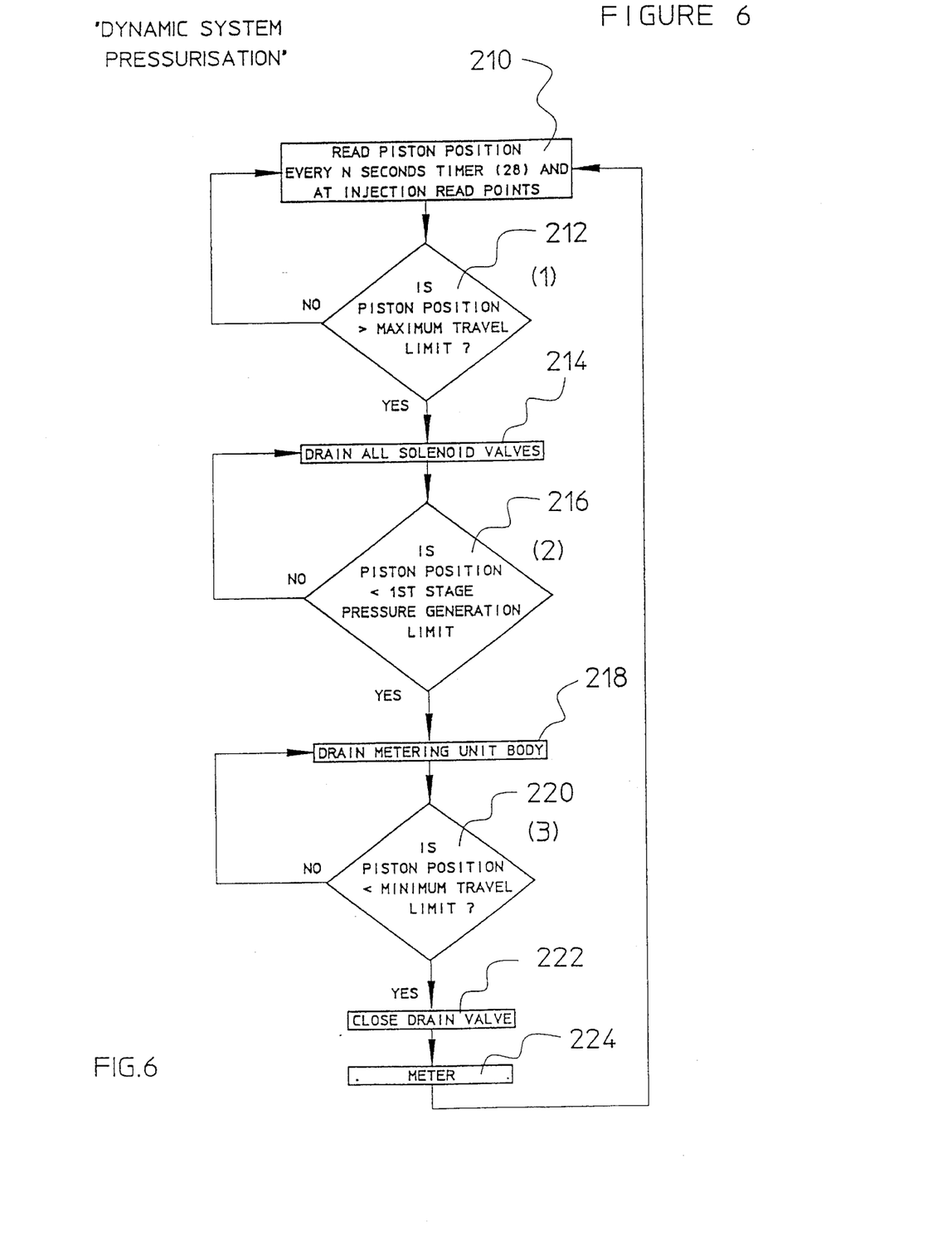
FIG. 6 shows a flow circuit diagram of a second sequence of operations of the equipment.

The full operating sequence for the drain procedure is illustrated in FIG. 6. This represents as a flow chart the drain program stored in the program memory 128 operated by the controller 60 when the equipment is in use. It comprises a first step 210 at which a reading is taken of the current position of the piston by the controller 60. This occurs at predetermined time intervals, and also at injection read points. The question is then posed at step 2 12 as to whether the piston position is beyond its maximum travel limit. This limit is a software limit determined by a value stored in the EEPROM memory 120, and is represented by the line 213 in FIG. 1. If that travel has not been exceeded, the flow path is looped back to step 210. If it has been exceeded, all solenoid valves are switched to connect their respective lines to the drain 48 at step 214. Following that, with step 216, the question is posed as to whether the piston has passed a first position, closer to the start end of travel than the maximum travel limit, this first position being again determined by a value stored in the EEPROM memory 120, and is represented by the line 217 in FIG. 1. If that limit has not been exceeded, the flow path is looped back to step 214. If it has, the next step 218 is executed, in which the solenoid valves 46 are switched to connect their lines 40 to the common delivery line 36, whilst the drain valve 52 remains in its open condition connecting the drain line 50 to the drain 48. This creates a feed of fuel or test oil to the metering chamber 22 whilst it is being drained, so that the pressure therein is increased, and at the same time, the rate of movement of the piston 14 towards its start end of travel is decreased. At the next step 220 the question is posed whether the piston has passed beyond its start end travel limit. This latter is again a software limit defined by a value stored in the EEPROM memory 120, and is represented by the line 221 in FIG. 1. If this limit has been exceeded step 222 is executed at which the drain valve 52 is closed. It is essential to this embodiment of the present invention that this occurs before the physical end of travel of the piston 14 is reached, so that the latter is free to move closer towards physical limit of the start end of travel after the solenoid valve 52 has been closed, under the inertia of the piston 14, so as to further build up the pressure of the fuel or test oil in the metering chamber 22 to or towards its dynamic equilibrium pressure before a further metering procedure is commenced. This occurs at step 224 whereafter the flow path shown in FIG. 6 is looped back to the first step 210 thereof. This means of pressurising the system during a drain procedure may be called "dynamic system pressurisation", in which the kinetic energy of the piston is used to increase the pressure of fuel or test oil in the system.

In the event that the piston does not reach the minimum travel limit at step 220, the flow path reverts back to step 218 to maintain draining of the metering chamber 22.

Figure 7:
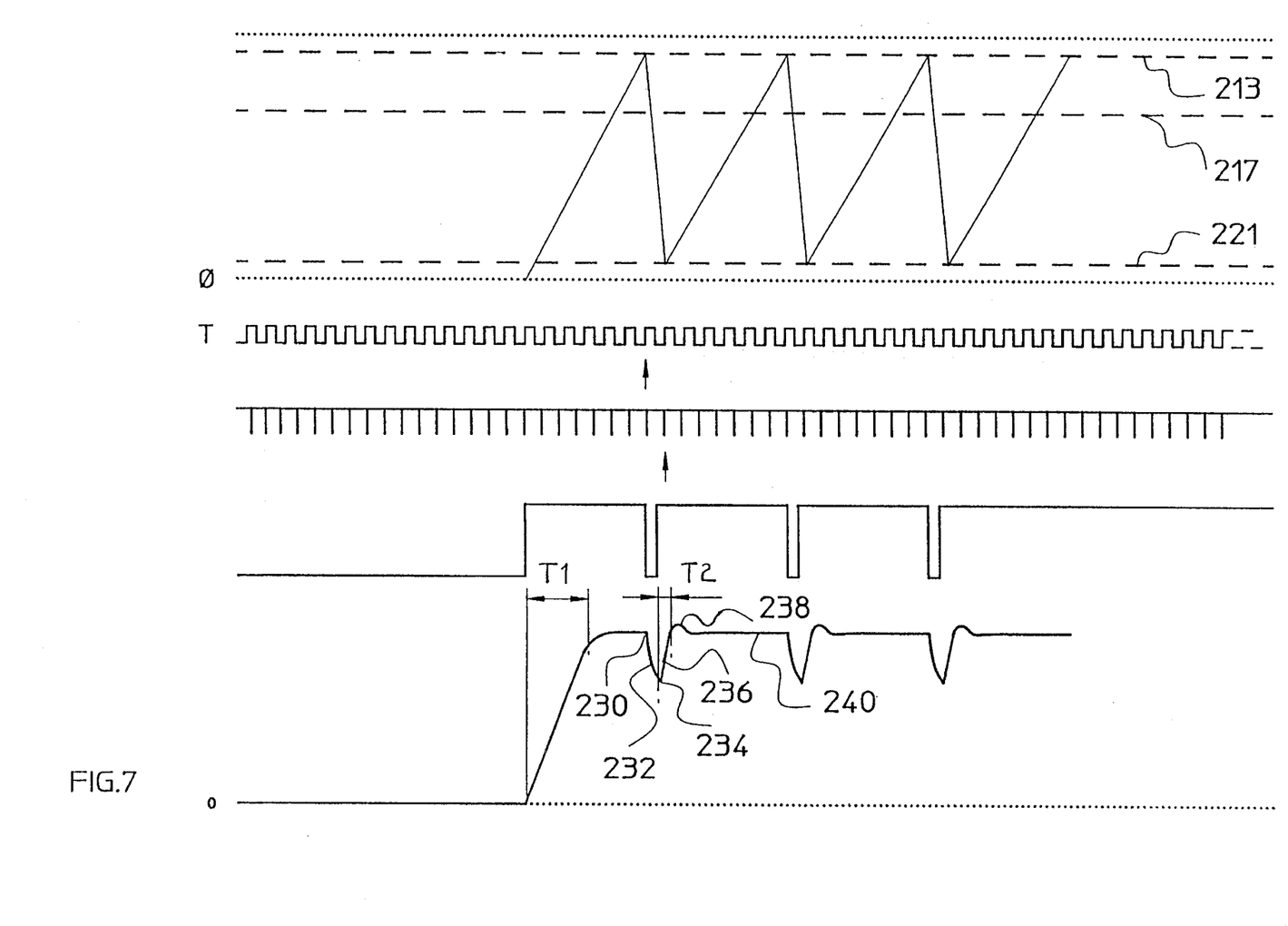
FIG. 7 shows a second timing diagram of operation carried out during the second operating sequence.

The consequence of such a "dynamic system pressurisation" procedure in the course of a series of measurements, is illustrated in the timing sequence of FIG. 7. The square wave pulse signal labelled T in this diagram, as in FIG. 5, represents time, and each square wave cycle represents a unit of time. As with FIG. 5, FIG. 7 is purely diagrammatic, so that the relative gradients illustrated do not necessarily reflect the gradients that would be found in actual equipment embodying the present invention. Neither does the temporal spacing between some of the illustrated events necessarily correspond to the corresponding spacing in actual metering equipment. Nonetheless, as with FIG. 5, the graphs in FIG. 7 share a common time scale.

As also with FIG. 5, FIG. 7 shows directly underneath the time scale T a dynamic sequence representing the injection read points. Below this is a square wave signal representing the state of the solenoid of the drain valve 52. A high level represents closure of that valve, so that a metering operation is in progress, and a low level represents times when that drain valve 52 is open to drain 48 (with reference to FIG. 1) to drain the metering chamber 22.

Directly underneath that square wave in FIG. 7 is shown a periodic wave function representing the hydraulic pressure in the system, for example in the metering chamber 22.

The uppermost graph in FIG. 7 represents the position of the piston as a function of time, so that, as with FIG. 5, greater distances of displacement of the piston within the cylinder are represented by higher points on the graph. The lower dotted line represents the extreme minimum displacements of the piston determined by the physical construction of the cylinder 12. The upper dotted line represents the extreme physical limit of movement of the piston at the other end of the cylinder 12. The lower and upper broken lines represent these limits of travel as set by the software present in the controller 60, these limits therefore being positioned inwardly of the physical limits. Thus it will be seen that at the start of the uppermost graph, the piston is positioned at its minimum physical displacement, or zero displacement, at its start end of travel. It moves towards its far travel limit defined by the software in the controller 60, whereupon a drain procedure commences, as represented by step 212 in FIG. 6, and the piston moves back towards its start end of travel, this being limited by a minimum travel limit defined by the software in the controller 60, as represented by step 220 in FIG. 6. Draining then ceases and the piston moves back towards its far limit of travel to repeat the cycle. The instants at which the direction of movement of the piston changes are determined by changes in the condition of the drain valve 52. Hence the timing of the trailing edges and the leading edges of the square wave graph for the metering solenoid generally coincide respectively with the instants of maximum and minimum displacement of the piston. The hydraulic pressure function at the bottom of FIG. 7 is a consequence of the sequence of operations set out in FIG. 6. It will be noted that the time taken for the pressure to reach the required metering pressure is greater at the very start of the operation of the system because the start-up procedures commence with a zero hydraulic pressure in the system, whereas during a draining and immediately following a draining procedure the pressure of the system is not allowed to fall anywhere near zero pressure.

Referring again to the hydraulic pressure function, it will be seen that at point 230 the piston reaches its maximum travel limit as set by the software in the controller 60 and as represented by step 212 in FIG. 6. A rapid decline in the hydraulic pressure therefore ensues until point 232, corresponding to step 216 in FIG. 6, and the position at which the lines 40 in FIG. 1 are open to the common delivery line 36 so that the hydraulic pressure function falls with a less steep gradient. Point 234 on the hydraulic pressure function represents step 220 in FIG. 6, and the instant at which the piston 14 shown in FIG. 1 reaches the minimum travel limit defined by the software in the controller 60. At this point, the hydraulic pressure climbs very steeply along the line 236, which is steeper than the climb at the very start of operation of the system, before any draining takes place, because it is effected not only by the fact that the lines 40 are open to the common delivery line 36 in FIG. 1, but also because of the increase in pressure created by the inertia of the piston 14 as it tends to over-shoot the minimum travel limit set by the software in the controller 60. This build-up of pressure peaks at point 238 whereupon it falls to the desired pressure sustained during dynamic equilibrium of the system, as represented by the horizontal line 240 in FIG. 7.

It will be appreciated that with previously proposed constructions of metering equipment, the piston 14 would be allowed to continue to its minimum physical limit of travel whereafter the lines 40 would be open to the common delivery line 36. This means that after a drain procedure the hydraulic pressure would fall to zero and the time taken to regain the dynamic equilibrium pressure would be that which is indicated by the time T1 in FIG. 7, which is considerably in excess of time T2.

The operator interface (not shown) may be constructed to enable signals to be sent, by means of a keypad, via the input 136, to inform the controller 60 which lines of the equipment are connected to a fuel injector, in the event that not all the lines are thus connected. The controller then subsequently considers only those lines, disregarding the others.

In an actual physical embodiment of the present invention, the number of injection read points between successive draining procedures may be in the range from 1 to 12,000. The diameter of the metering chamber 22 may be in the range from 10 mm to 125 mm and the diameter of the piston 14 may be in the range from 5 mm to 100 mm. The length of the latter may be in the range from 5 mm to 500 mm, and its weight may be in the range from 1 g to 300 g. The speed it reaches during a draining sequence may be a maximum of 2,500 mm/s slowing to 0 mm/s at the instant of closure of the drain 52.

The manner in which the various inputs to and outputs from the controller 60 are connected is set out in the following table:

| Reference numeral of input/output in FIG. 2 connected | Reference number(s) of pin(s) of the 8752BH micro-controller, as given by Intel, to which that input/output is |
|---|---|
| 86 | P3.3 (INT1) |
| 88 | P3.2 (INT0) |
| 71 | P1.0 to P1.7, and P3.5 |
| 76 | P3.4 |
| 96 | P3.6 and P3.7 |
| 106 (upper) | P2.6 |
| 102 | P0.0 to P0.7 |
| 106 (lower) | P2.7 |
| 120 | P3.6 and P3.7 |

Numerous variations and modifications to the illustrated equipment will readily occur to a person of ordinary skill in the art without taking it outside the scope of the present invention. To give an example, the software limits of movement of the piston 14 may instead be set by physical electrical contacts which are established when the piston reaches those limits. A further example is the use of a supply of oil pressure, or a return spring, or simply a return mass operating under the influence of gravity, instead of the supply of air pressure 32.

Since, upon a change in the state of one or more of the solenoid valves of the system, the disturbances resulting die away with time, an increase in the values set for X, Y, and Z could be made to sacrifice speed of update of the system for improved accuracy. Accuracy can be sacrificed for speed of update by increasing the number of pump shaft revolutions a given test is run over.

The volumes of the injections as accumulated in the delivery array may be temperature corrected by means of the temperature correction 124e in the main loop 124h.

Figure 8:
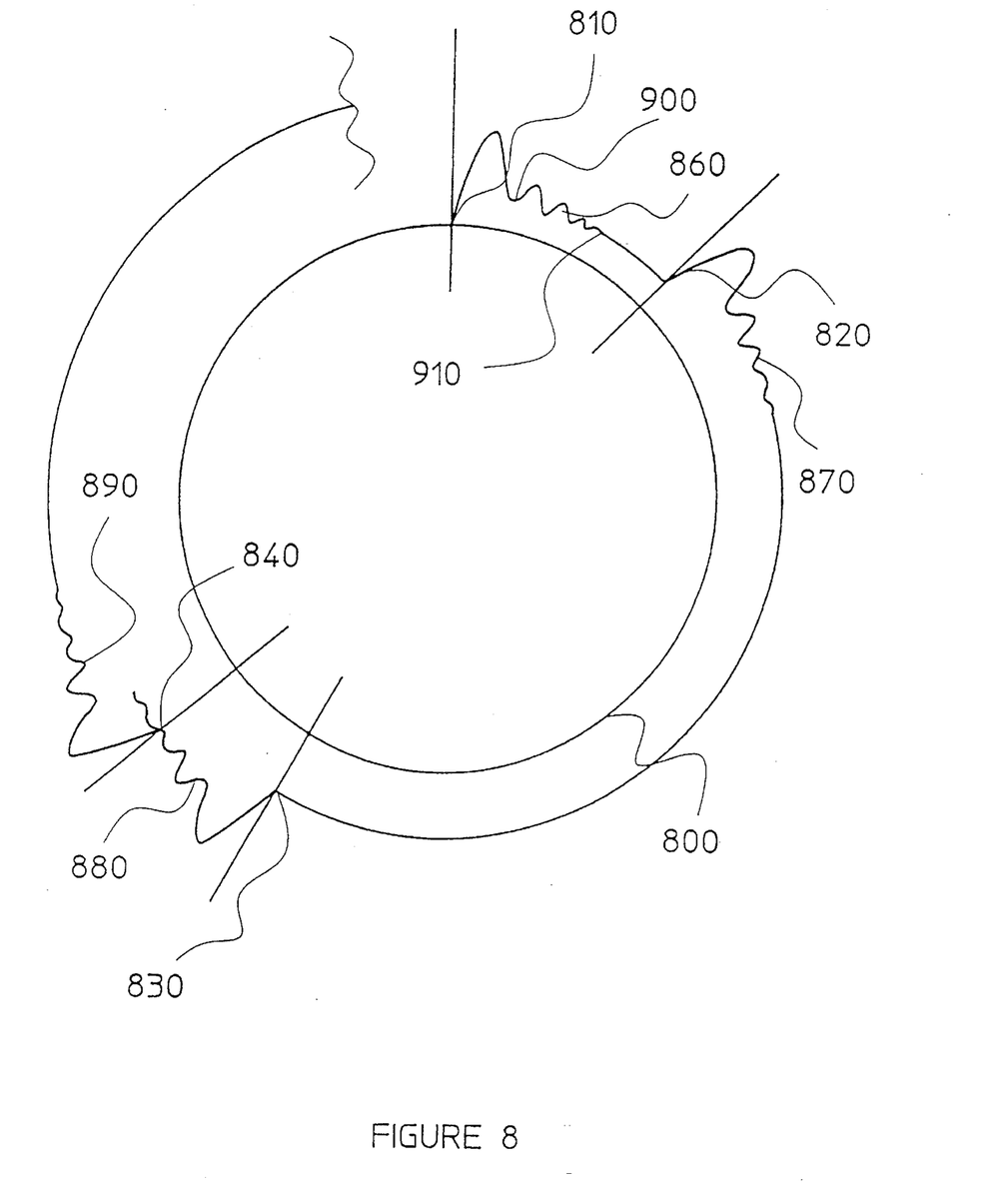
FIG. 8 is an explanatory diagram.

The circle 800 in FIG. 8 represents a time scale in which the full circle corresponds to one complete revolution of the pump shaft. Therefore a point on the circle may represent the occurrence of an event in a cycle which is repeated in each cycle and which has a phase angle given by the angle between a line which passes through that point and the centre of the circle, and another line which passes through the start of the cycle and the centre of the circle. Points 810, 820, 830 and 840 represent injection points of respective lines 38 of the equipment shown in FIGS. 1 and 2. The oscillating curves 860, 870, 880 and 890 represent oscillatory movement of the piston 14 following an injection. Thus, following for example the injection point 810, the piston 14 first moves linearly until the point 900 is reached. Damped oscillatory motion then occurs until the point 910 is reached. It has been found empirically that the time gap between points 810 and 910 is given by the equation:

$$y = mx + c$$

where y is the time gap, x is the volume of fluid delivered per injection, and m and c are constants. From the values already referred to which are present in the controller 60, together with the empirically ascertained values of m and c which may be entered at the time of manufacture of the equipment or via the operator interface (not shown) at a later stage, the controller 60, being programmed to calculate the value of y from the measured value of x, is able to determine, for each and every injection, whether the next succeeding injection occurs before or after the time y has elapsed. In the event of the former, as shown for example following injection point 830, the controller 60 sends command signals via its output 102 to switch some of the solenoid valves 46 to connect their associated lines 40 to drain 48. Thereafter, the group or bank of lines which remain connected to the metering unit 10 are, after a predetermined number of injections, disconnected, and the ones which were disconnected are connected. The controller 60 so selects the groups as to minimize the risk of fluid being injected into the chamber of the metering unit 10 before the piston 14 has come to rest momentarily, immediately following the next previous injection.

It will be appreciated from the foregoing description that the illustrated equipment can accurately measure multi-line fuel injection deliveries irrespective of the angular firing relationship between the them. Also, that the illustrated equipment can accomodate up to twelve injection lines, piped in any order and not necessarily to no:1 injector, for the injection pumps with uneven firing angles and odd numbers of injection lines.

We claim:

1. Volumetric metering equipment, especially but not exclusively for use in metering the volume of fluid pumped through one or more injectors by a diesel-engine fuel injection pump, the equipment comprising (a) a metering unit having a chamber-defining part and a movable part, within the chamber-defining part, which is moveable in a given direction to increase the size of the chamber defined by the chamber-defining part and in the opposite direction to decrease the size of the chamber, (b) input and output port means of the chamber-defining part, the input and output port means being in communication with the chamber, (c) at least one input line connected to the input port means, (d) an input fluid-flow valve included in the said at least one input line, (e) an outlet line connected to the said output port means and (f) a drain fluid-flow valve included in the output line, the equipment being such as to require a predetermined minimum operating pressure of fluid within the chamber, in which end-approach signal means are connected to the metering unit and are so constructed as to provide an end-approach signal when the moveable part is a predetermined distance away from the physical end of the available travel in the said opposite direction, and in which drain valve control means are directly or indirectly connected to the end-approach signal means and the drain valve and are so constructed as to close the drain valve upon receipt of an end-approach signal from the end-approach signal means, whereby (i) the inertia of the moveable part creates an increase in pressure of fluid in the chamber, to a required minimum operating pressure, by the time the speed of movement of the moveable part in the said opposite direction falls to zero, and/or (ii) the return force applied to the moveable member to move it in the said opposite direction remains transmitted to fluid in the chamber when the speed of movement of the moveable part in that direction falls to zero.

2. Volumetric metering equipment according to claim 1, in which the end-approach signal means are also so constructed as to provide a preliminary end-approach signal before the end-approach signal referred to in claim 1, and in which input fluid-flow valve control means (i) are directly or indirectly connected to the end-approach signal means and the input fluid-flow valve and (ii) are so constructed as to open the input fluid-flow valve upon receipt of a preliminary end-approach signal from the end-approach signal means, whereby the pressure of fluid in the chamber is increased by the opening of the input line to the chamber prior to any effect of the end-approach signal referred to in claim 1.

3. Volumetric metering equipment according to claim 1, in which the end-approach signal means comprise a linear encoder arranged to provide an indication of the position of the moveable part relative to the chamber-defining part.

4. Volumetric metering equipment, for use in metering the volume of fluid pumped through one or more injectors by a fuel injection pump, in which means are provided which serve to cause a number of injections to be disregarded immediately following a change in which of the lines, including the drain line, are opened to a metering unit of the equipment, in dependence upon the average volume of fluid delivered to the metering unit per injection immediately before, at or immediately after the time of the change.

5. Volumetric metering equipment according to claim 4, in which the volume of injections is measured immediately before, at, or immediately after such a change, and from that volume the number of injections which are to be disregarded immediately following a change in which of the lines are open to the metering unit is computed.

6. Volumetric metering equipment according to claim 4, in which means are incorporated which cause the injections required to displace the moveable member of the metering unit by a predetermined distance to be disregarded.

7. Volumetric metering equipment, especially but not exclusively for use in metering the volume of fluid pumped through one or more injectors by a diesel-engine fuel injection pump, the equipment comprising (a) a metering unit having a chamber-defining part and a moveable part, within the chamber-defining part, which is moveable in a given direction to increase the size of the chamber defined by the chamber-defining part, (b) input and output port means of the chamber-defining part, the input port means being in communication with the chamber, (c) at least one input line connected to the input port means, (d) an input fluid-flow valve included in the said at least one input line, (e) monitoring means connected to the metering unit and constructed to provide electrical signals indicative of movement of the moveable part, and (f) a processor connected to the monitoring means to receive such electrical signals and constructed or programmed to provide an indication therefrom of the volume of fluid delivered to the chamber via the said input line, (g) an outlet line connected to the said output port means, and (h) a drain fluid-flow valve included in the output line, in which the processor is also connected to receive electrical signals indicative of a change in the state of the said at least one input fluid-flow valve or a change in the state of the drain fluid-flow valve, and is constructed or programmed to disregard the volume of fluid delivered to the chamber which corresponds to a predetermined displacement of the moveable member immediately following such a change, so as to reduce the likelihood of errors arising through transients not having died away when the equipment is in use while at the same time reducing the likelihood of time being wasted by too much fluid delivered to the chamber, immediately following such a change, being disregarded.

8. Volumetric metering equipment according to claim 7, further comprising detector means arranged to detect pulses within such fluid, and connected to the said processor, the latter being constructed or programmed to disregard the volume of fluid delivered to the chamber at least for the period while a predetermined number of such pulses occur immediately following such a change.

9. Volumetric metering equipment according to claim 8, in which the processor is further constructed or programmed so that, upon expiry of a longer period, corresponding to a second predetermined number of pulses occurring immediately following such a change, the processor no longer disregards the volume of fluid delivered to the chamber, in the event that such expiry occurs before the moveable part has undergone the said predetermined displacement immediately following such a change.

10. Volumetric metering equipment comprising (a) a metering unit having a chamber-defining part and a moveable part, within the chamber-defining part, which is moveable in a given direction to increase the size of the chamber defined by the chamber-defining part, (b) input and output port means of the chamber-defining part, the input and output port means being in communication with the chamber, (c) at least one input line connected to the input port means and also connected to receive fluid from a fuel pump injector when the equipment is in use, (d) an input fluid-flow valve included in the said at least one input line, (e) monitoring means connected to the metering unit and constructed to provide electrical signals indicative of movement of the moveable part, and (f) a processor connected to the monitoring means to receive such electrical signals and constructed or programmed to provide an indication therefrom of the volume of fluid delivered to the chamber via the said input line, (g) an outlet line connected to the said output port means, and (h) a drain fluid-flow valve included in the output line, in which the processor is also connected to receive electrical signals indicative of a change in the state of the said at least one input fluid-flow valve or a change in the state of the drain fluid-flow valve, and is constructed or programmed to disregard the volume of fluid delivered to the chamber which corresponds to a number of injections, that number being dependent upon at least one characteristic of the delivery of fluid to the metering unit, such as the volume or rate of injections immediately before, at, or immediately after such a change, so as to reduce the likelihood of errors arising through transients not having died away when the equipment is in use while at the same time reducing the likelihood of time being wasted by too much fluid delivered to the chamber, immediately following such a change, being disregarded.

11. Volumetric metering equipment having a plurality of inputs connected to respective lines of a fuel injection pump under test when the equipment is in use, means to provide a measure of the time between two successive injections, means to compute the expected time taken for the equipment to reach a temporary static condition following the first of those injections, and means to reduce the number of lines the fluid from which is being metered at any given instant in the event that the measured time is less than the computed time.

* * * * *